United States Patent
Archiable

(10) Patent No.: US 7,254,421 B2
(45) Date of Patent: Aug. 7, 2007

(54) CONFIGURABLE WIRELESS COMPUTER COMMUNICATION ATTENUATION DEVICE

(75) Inventor: Donald Paul Archiable, Chagrin Falls, OH (US)

(73) Assignee: Archteck, Inc., Cleveland, OH (US)

( * ) Notice: Subject to any disclaimer, the term of this patent is extended or adjusted under 35 U.S.C. 154(b) by 616 days.

(21) Appl. No.: 10/826,542

(22) Filed: Apr. 16, 2004

(65) Prior Publication Data

US 2005/0233779 A1  Oct. 20, 2005

(51) Int. Cl.
*H04B 1/38* (2006.01)

(52) U.S. Cl. .................. 455/574; 455/522; 455/69; 455/249.1

(58) Field of Classification Search .............. 455/574, 455/522, 66.1, 226.1, 249.1, 422.1, 250.1, 455/251.1; 375/224
See application file for complete search history.

(56) References Cited

U.S. PATENT DOCUMENTS

| | | | | |
|---|---|---|---|---|
| 4,301,445 A | * | 11/1981 | Robinson | 340/10.41 |
| 5,015,965 A | * | 5/1991 | Katz et al. | 330/149 |
| 5,663,968 A | * | 9/1997 | Heuer | 714/745 |
| 6,445,732 B1 | * | 9/2002 | Beamish et al. | 375/224 |
| 2003/0148736 A1 | * | 8/2003 | Wright et al. | 455/66 |
| 2003/0217349 A1 | * | 11/2003 | Matsumoto et al. | 716/15 |
| 2005/0003763 A1 | * | 1/2005 | Lastinger et al. | 455/63.1 |
| 2005/0010755 A1 | * | 1/2005 | Sheth et al. | 713/155 |
| 2005/0053008 A1 | * | 3/2005 | Griesing et al. | 370/241 |
| 2006/0045054 A1 | * | 3/2006 | Utsumi et al. | 370/338 |

OTHER PUBLICATIONS

Preliminary Information Sheet; Atmel, AT86RF210 Z-Link Transceiver; 868/902-928 MHz Direct Sequence Spread Spectrum BPSK Transceiver; Amtel Corporation; Oct. 2003.
Wireless; IA4220 Universal ISM Band FSK Transmitter; programmable, low-power data transmitter for robust, low-cost wireless inks; Integration Associates; 2003.
Cisco Aironet 1100 Series; Cisco Systems, Inc.; 1992-2004.

* cited by examiner

*Primary Examiner*—Matthew Anderson
*Assistant Examiner*—Tan Trinh
(74) *Attorney, Agent, or Firm*—McDonald Hopkins LLC

(57) ABSTRACT

Systems, methodologies, and other embodiments associated with reconfiguring a wireless computer communication device by processing an output signal provided by the device are described. One exemplary system embodiment includes an attenuation circuit configured to attenuate a computer communication signal generated by the wireless computer communication device to a desired level. The example system may also include an attenuation level logic configured to determine the desired attenuation level. In one example, the desired attenuation level may be determined based on the proximity of wireless devices.

10 Claims, 4 Drawing Sheets

CONFIGURABLE WIRELESS COMPUTER COMMUNICATION ATTENUATION DEVICE

BACKGROUND

Electromagnetic waves produced by wireless computer communication devices continue to reach ever deeper into our world. Coffee shop hot-spots, wireless classrooms, wireless-enabled furniture and other systems have expanded the boundaries of the wireless world. Wireless devices like cell phones, personal digital assistants, and computers use wireless computer communications technology to facilitate device and work mobility. Advertised benefits of wireless technology include increasing productivity, mobility, flexibility, and efficiency. However, expanding wireless computer communications may not be without risks. For example, wireless computer communications expose users (and those in the zone of influence) to electromagnetic radiation much like smokers expose non-smokers to second-hand smoke. The same electromagnetic waves that enable wireless computer communications also pass through the human body, sometimes in potentially dangerous power and frequency combinations. Aside from potential health risks, electromagnetic waves associated with one wireless computer communication device may interfere with another wireless communication device. Similarly, wireless communications that spread over an area that is larger than necessary to effect the communication may be more susceptible to interception. Thus, the seemingly ever expanding range and power of modern wireless devices may pose health, productivity, and security risks to users, devices, and wireless computer networks.

In light of current trends (e.g., more power, more devices), negative effects of electromagnetic radiation associated with wireless computing may be expected to increase. Manufacturers seem focused on increasing wireless product performance (e.g., range, throughput) while ignoring the potential harmful effects of their product(s). Thus, "off-the-shelf" wireless computing components (e.g., routers, repeaters) typically are available with a fixed, maximum signal strength. While portable computing devices (e.g., laptops, PDAs) may include power-reducing circuits, logics, and/or programs, off-the-shelf wireless computing components like routers have been slower to adapt. Furthermore, users who have already purchased wireless computing devices may not be able to reap the benefits of the newer, smarter, self-configuring, power-aware portable computing devices.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
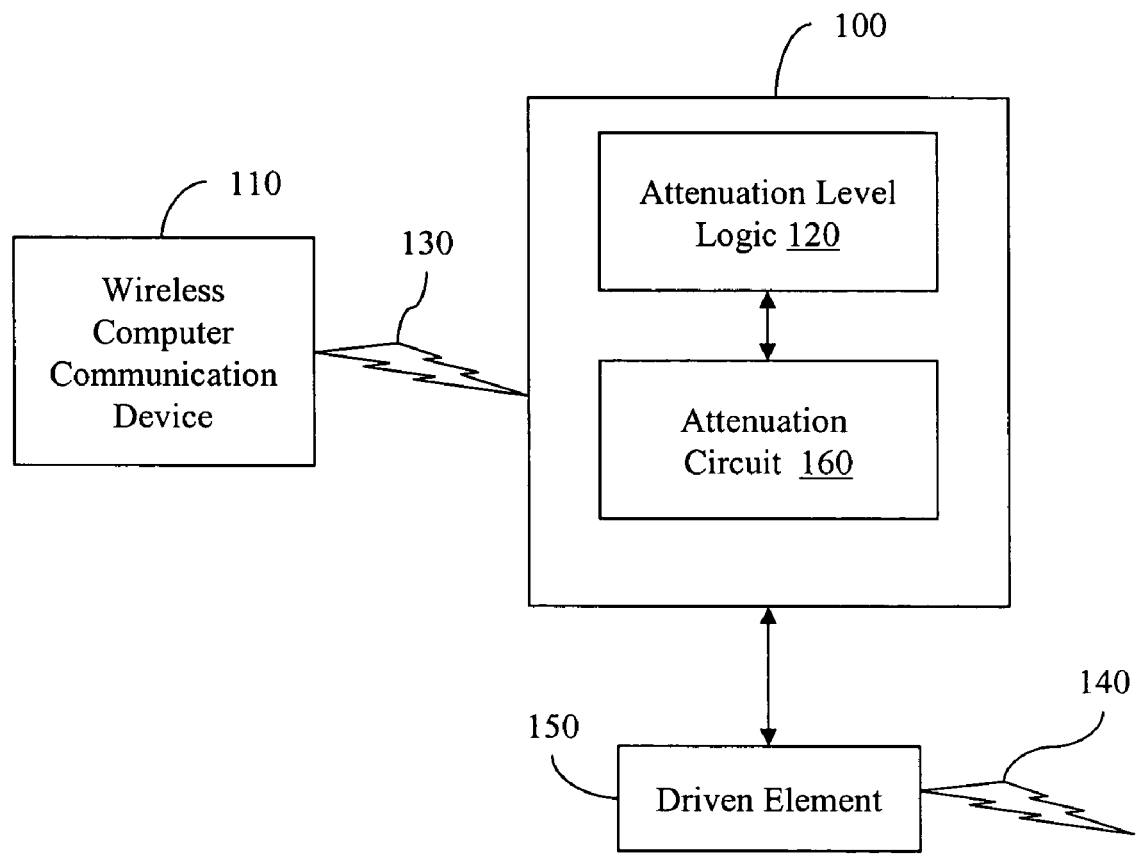
FIG. 1 illustrates an example system configured to reconfigure a wireless computer communication device by processing a signal produced by the wireless computer communication device.

In some environments, attenuation-configurable wireless devices may be preferable to non-configurable high power wireless devices since they may facilitate reducing radio frequency energy produced in wireless computer communications. Attenuation-configurable wireless devices may facilitate minimizing health risks, interference, and security risks by facilitating tailoring a signal strength to a lower power when possible. However, users may have already purchased fixed, maximum power wireless devices. Thus, example systems and methods described herein concern reconfiguring fixed power wireless computer communication devices by dynamically reconfiguring signal power by controlling a signal attenuation device. "Off-the-shelf" wireless devices may be equipped with and/or be operably connected to example systems and methods described herein to facilitate dynamically reconfiguring output signals. Reconfiguring the output signals produced by the off-the-shelf devices to various lower power levels may include, for example, associating (e.g., connecting) fixed and/or configurable attenuation device(s) to the off-the-shelf device, associating a manually or automatically configurable reduction bridge to the off-the-shelf device, and/or associating a configurable "line-loss" device to the off-the-shelf device. While "off-the-shelf" devices are described, it is to be appreciated that the example systems and methods can be employed to reconfigure the outputs of other (e.g., custom designed, home-built) devices.

In one example, a wireless computer communication device may dynamically have its output signal strength reconfigured without changing its internal power level. The signal strength may be attenuated based, at least in part, on a determined proximity to a wireless device with which the wireless computer communication device is communicating. For example, a wireless router may be positioned in a large convention room that can be partitioned into several smaller rooms. When the large convention room is being used in its wide open configuration, the wireless router may be communicating with wireless devices located from two feet away up to, for example, two hundred feet away. Thus, the wireless router that is equipped with example systems and/or methods described herein may be configured to accommodate communications in this range of distances. However, when the large convention room is partitioned into a smaller configuration, the wireless router may be communicating with wireless devices located from two to only thirty feet away. Conventionally, the wireless router would have one power level and would not be able to react to this different situation. Typically the power level would be the maximum allowed by law (e.g., FCC regulation) or the maximum defined in a standard (e.g., 150 feet as per IEEE 802.11). Thus, users and bystanders would be exposed to the maximum power signal even though a lower power signal would suffice. When the farthest away device is only 30 feet away, this maximum power may be unnecessary and undesirable. However, the off-the-shelf component conventionally may not be reconfigurable. Thus, wireless computer communication devices like wireless routers may be equipped with and/or associated with example systems and methods described herein to facilitate having their output signals programmatically and/or manually reconfigured to accommodate changing communication ranges. Thus, lower power electromagnetic waves may be transmitted, yielding a potentially safer, more secure, smaller, and less intrusive wireless environment.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example system 100 configured to reconfigure a wireless computer communication device 110 by processing an output of the device 110. The wireless computer communication device 110 may be, for example, an off-the-shelf device like a router, repeater, network device, and so on. In one example, the wireless computer communication device 110 transmits wireless computer communications conforming to industry standards like an IEEE 802.11 format and/or an IEEE 802.15 format. While two IEEE (Institute for Electrical and Electronic Engineers) formats are described, it is to be appreciated that other formats may be employed. The wireless computer communication device 110 may send a signal 130 to the system 100. The system 100 will selectively attenuate the signal 130 to produce a signal 140 that will be broadcast to a receiving wireless device. The system 100 may be operably connected to a driven element 150 (e.g., antenna) that broadcasts the signal 140. Thus, the system 100 reconfigures the device 110 by processing signal 130 into signal 140.

The system 100 may include an attenuation level logic 120 that is operably connectable to the wireless computer communication device 110. The attenuation level logic 120 may be configured to determine a desired attenuation level for the wireless computer communication signal 130 produced by the wireless computer communication device 110. The wireless computer communication signal 140 may be derived from the signal 130 by attenuating the signal 130 under the control of the attenuation level logic 120.

Thus, the system 100 may include an attenuation circuit 160 that is operably connected to the attenuation level logic 120. The attenuation circuit 160 may be configured to attenuate the wireless computer communication 130 to the desired attenuation level to produce signal 140. While the system 100 is illustrated outside and separate from the wireless computer communication device 110, it is to be appreciated that in some examples the system 100 and/or portions thereof may be located inside the wireless computer communication device 110.

In one example, the attenuation circuit 160 may be manually controllable by a user. For example, the system 100 may include a user positionable switch that facilitates changing the attenuation level. The switch may facilitate selecting, for example, various paths through which the signal 130 will pass to produce the signal 140.

In another example, the attenuation circuit 160 may be programmatically controllable by the attenuation level logic 120. For example, the attenuation level logic 120 may be configured to communicate a control signal to the attenuation circuit 160 that causes the attenuation circuit 160 to change the attenuation level. Once again the control signal may facilitate selecting, for example, various paths and/or devices through which signal 130 will pass to produce signal 140.

The attenuation circuit 160 may take various forms. In one example, the attenuation circuit 160 comprises a set of attenuators. Example attenuators may include, for example, various commercially available attenuators like a Bird Electronics 10 dB attenuator, a Coaxial Dynamics 20 dB attenuator, and so on. In another example, the attenuation circuit 160 may be a reduction bridge circuit. The reduction bridge circuit may take as an input a desired attenuation level and selectively control the resistance in the reduction bridge to attenuate signal 130 to the desired level. In another example, the attenuation level logic 120 may facilitate attenuating signal 130 to signal 140 by controlling a line-loss device associated with the attenuation circuit 160. The line loss device may be located between the wireless computer communication device 110 and the driven element 150.

In one example, the line-loss device may include transmission media (e.g., coaxial cables) having different selectable line loss characteristics. In one example, a line loss characteristic may be related to, for example, the length of coaxial cable through which signal 130 will travel before being delivered to driven element 150. In another example, a line loss characteristic may be related to a dielectric material associated with a coaxial cable through which signal 130 travels before being delivered to driven element 150. While cable length and dielectric material are described, it is to be appreciated that other cable properties may contribute to line loss characteristics. Similarly, while a coaxial cable is described, other transmission means like wires may be employed.

A manual switch may be moved to route signal 130 through different attenuators producing different levels of attenuation and thus different signal strengths in signal 140. Similarly, a programmatically controlled switch may be manipulated to route signal 130 to different attenuators. Thus, rather than is typical in conventional devices where there is no configurable attenuation, a wireless computer communication device 110 equipped with system 100 may be dynamically reconfigurable to produce signals with different strengths due to the action of the system 100. Thus, the signals may be safer, more secure, and more specifically broadcast. Small reductions in signal strength can have large effects on power density exposure experienced by those within range of the signal. The well known inverse quadratic relationship describes how a linear reduction in signal power yields a quadratic reduction in signal range. Since signals propagate outward spherically, the quadratic range reduction yields a "double quadratic" reduction in overall power density exposure, since the radius of the sphere decreases quadratically.

The attenuation level logic 120 may determine the desired attenuation level by various methods. In one example, the attenuation level logic 120 may determine the desired attenuation level based on the distance between the wireless computer communication device 110 and a receiver of the signal 140. In another example, the attenuation level logic 120 may determine the desired attenuation level by causing the transmission of a set of "negotiation" messages at different attenuation levels and then evaluating a response to the set of negotiation messages. Since a wireless communication environment may be dynamic, one example system 100 may be configured to redetermine the desired attenuation level. The redetermination may be made, for example, periodically and/or in response to an event (e.g., reset, user command).

In one example, system 100 may be a device like a box of electronics that sits beside the device (e.g., router) whose output signal is to be reconfigured. But, the device whose signal is to be reconfigured may be, for example, a plug-in card in a computing system. Thus, in another example, the system 100 may be physically located between, for example, a computer acting as a logical wireless computer device and a plug-in card acting as the physical wireless computer device. For example, a laptop computer may be configured with an 802.11 card inserted into a PCMIA slot. Both the computing logics on the 802.11 card (e.g., processor) and the radio components (e.g., driven element) on the card may receive power from the laptop. Thus, in one example, the system 100 may be physically inserted into the PCMIA slot, becoming located between the laptop and the 802.11 card to facilitate controlling, for example, the power supplied to the 802.11 card antenna. While a PCMIA slot is described, it is to be appreciated that the system may be placed between a bus and a device, a port (e.g., USB port) and a device, and so on.

Figure 2:
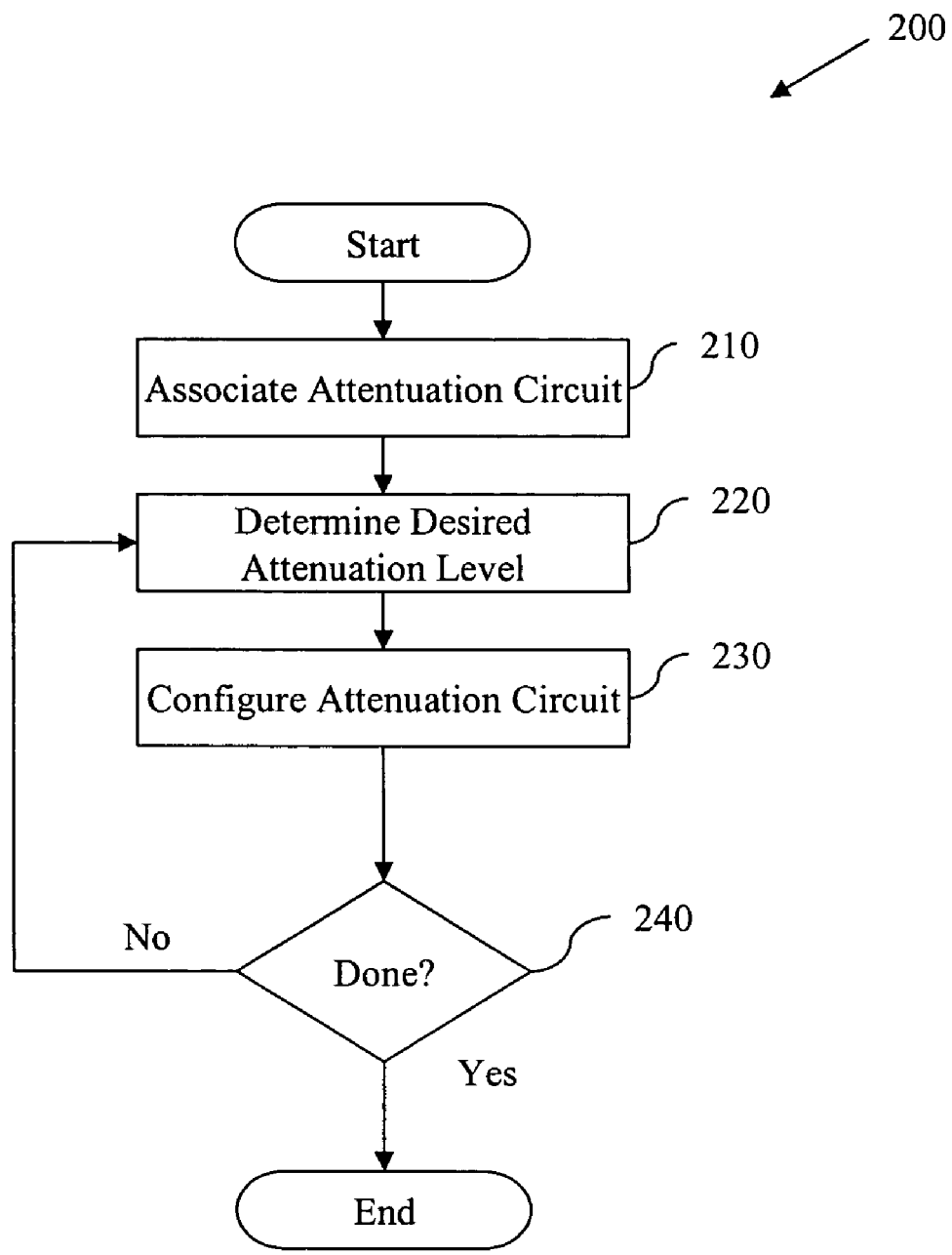
FIG. 2 illustrates an example method for (re)configuring a wireless computer communication device by processing a signal produced by the wireless computer communication device.

Example methods may be better appreciated with reference to the flow diagram of FIG. 2. While for purposes of simplicity of explanation, the illustrated methodology is shown and described as a series of blocks, it is to be appreciated that the methodology is not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 2 illustrates an example method 200 for (re)configuring a wireless computer communication device by processing a signal output by the device. The method 200 includes, at 210, associating an attenuation circuit with a wireless computer communication device. The attenuation circuit will participate in selectively processing (e.g., attenuating) a signal produced by the device. Associating the attenuation circuit with the wireless computer communication device may include, for example, detaching an antenna from the wireless computer communication device and connecting an attenuating device that includes the attenuation circuit to the wireless computer communication device via the now open antenna connector. While connecting an attenuation circuit into an antenna connection is described, it is to be appreciated that other connection/association techniques known in the art may be employed. The attenuation circuit may be, for example, an attenuator (e.g., Bird Electronics 10 dB attenuator), a variable resistance circuit (e.g., reduction bridge), a line-loss device, and the like. The attenuation circuit facilitates changing the power of a signal produced from a wireless computer communication signal provided by the wireless computer communication device.

Thus, the method 200 may include, at 220, determining a desired attenuation level for a wireless computer communication signal to be produced from a wireless computer communication signal provided by the wireless computer communication device. In one example, determining the desired attenuation level includes receiving a signal from a user. For example, a user may turn a knob on a device, may enter a value into a graphical user interface, may speak a command into a device, and so on, to indicate a desired attenuation level. Establishing the desired attenuation level may include, for example, selecting an attenuator through which a signal will pass, selecting a transmission medium (e.g., coaxial cable) with desired line-loss properties, changing the resistance in a reduction bridge, and so on. As described above, a wireless environment may be dynamic (e.g., devices may move around) and thus the desired attenuation level may be re-established in response to, for example, another user input.

In another example, determining the desired attenuation level may include calculating a distance between the wireless computer communication device and a receiver of the wireless computer communication signal. Then the desired attenuation level may be computed based, at least in part, on the distance. In one example, the distance may be determined using global positioning system data. Since a wireless communication environment may change, the method 200 may also include recalculating the distance between the wireless computer communication device and the receiver of the wireless computer communication signal and redetermining the desired attenuation level based, at least in part, on the recalculated distance. The redetermination may occur, for example, periodically and/or in response to an event (e.g., user input, system reset, interrupt).

In another example, determining the desired signal attenuation level may include calculating a signal strength for a wireless signal from wireless device and determining the desired attenuation level based on the signal strength. For example, a system may be programmed with data that describes the signal strength associated with a certain type of device being located at various distances from the system. By way of illustration, a laptop configured with an 802.15.1 card may be known to produce a signal with a certain strength. Based on a received signal strength, the distance between the laptop and the receiving unit may be estimable. By way of further illustration, a desktop system configured with an 802.11 repeater may be known to produce a different strength signal. Based on the received signal strength, the distance between the desktop system and the receiving unit may be estimable. Since a wireless environment may be dynamic, the method may also include recalculating the signal strength for a wireless signal received from the wireless device and redetermining the desired attenuation level based, at least in part, on the recalculated signal strength. Signal strength of a signal produced by the device reconfigured by performing method 200 may also be employed to determine the attenuation level. For example, a receiving device may respond to a message from the reconfigured device with a quality of signal indicator. The reconfigured device may then adapt its attenuation level in response to the quality of signal indicator.

In another example, determining the desired attenuation level m ay include a detection and/or negotiation phase. For example, the method 200 may include transmitting a set of wireless computer communications to a wireless device with which the wireless computer communication device is communicating. The set of wireless computer communications may be attenuated to different power levels. Then, the method 200 may determine the desired attenuation level based on a response(s) to the set of wireless computer communications. For example, if a very low power signal is responded to, then the method 200 may configure a very high attenuation level for the outgoing signal. But if the lowest power signals are not responded to while medium power signals are, then the attenuation level may not be configured so high. Once again, since a wireless environment may be dynamic, the method 200 may include retransmitting the set of wireless computer communications and redetermining the desired attenuation level based on a response(s) to the retransmitting.

The method 200 may also include, at 230, configuring the attenuation circuit to attenuate the wireless computer communication signal to the desired attenuation level. In one example, configuring the attenuation circuit may include programmatically changing the resistance produced by a reduction bridge. For example, a desired attenuation level can be provided as an input to a programmatically controllable reduction bridge. In another example, configuring the attenuation circuit may include selecting a desired line loss associated with a coaxial cable through which a wireless computer communication signal passes before being transmitted. For example, the attenuation circuit could be associated with an attenuation device that includes various cables with various line-loss characteristics related to cable length, dielectric material, cable diameter, and so on. A desired attenuation level can be provided as an input to the attention circuit that then selects a cable with a desired line-loss property. In yet another example, configuring an attenuation circuit may include selecting an attenuator through which a wireless computer communication signal passes before being transmitted. For example, an attenuation circuit may be associated with an attenuation device that includes a set of attenuators (e.g., 10 dB attenuator, 20 dB attenuator, 30 dB attenuator). Which attenuator a wireless computer communication signal is passed through before being delivered to a driven element (e.g., an antenna) for transmission may be determined by the attenuation circuit based on an input determined by the desired attenuation level.

While FIG. 2 illustrates various actions occurring in serial, it is to be appreciated that various actions illustrated in FIG. 2 could occur substantially in parallel. By way of illustration, a first process could determine a desired attenuation level while a second process could configure an attenuation circuit. In one example, in a highly dynamic wireless environment (e.g., automotive application), the two processes may perform their actions substantially continuously and thus the wireless computer communication signal may be undergoing substantially constant signal strength changes due to changing attenuation levels. While two processes are described, it is to be appreciated that a greater and/or lesser number of processes could be employed and that lightweight processes, regular processes, threads, and other approaches could be employed. It is to be appreciated that other example methods may, in some cases, also include actions that occur substantially in parallel.

Figure 3:
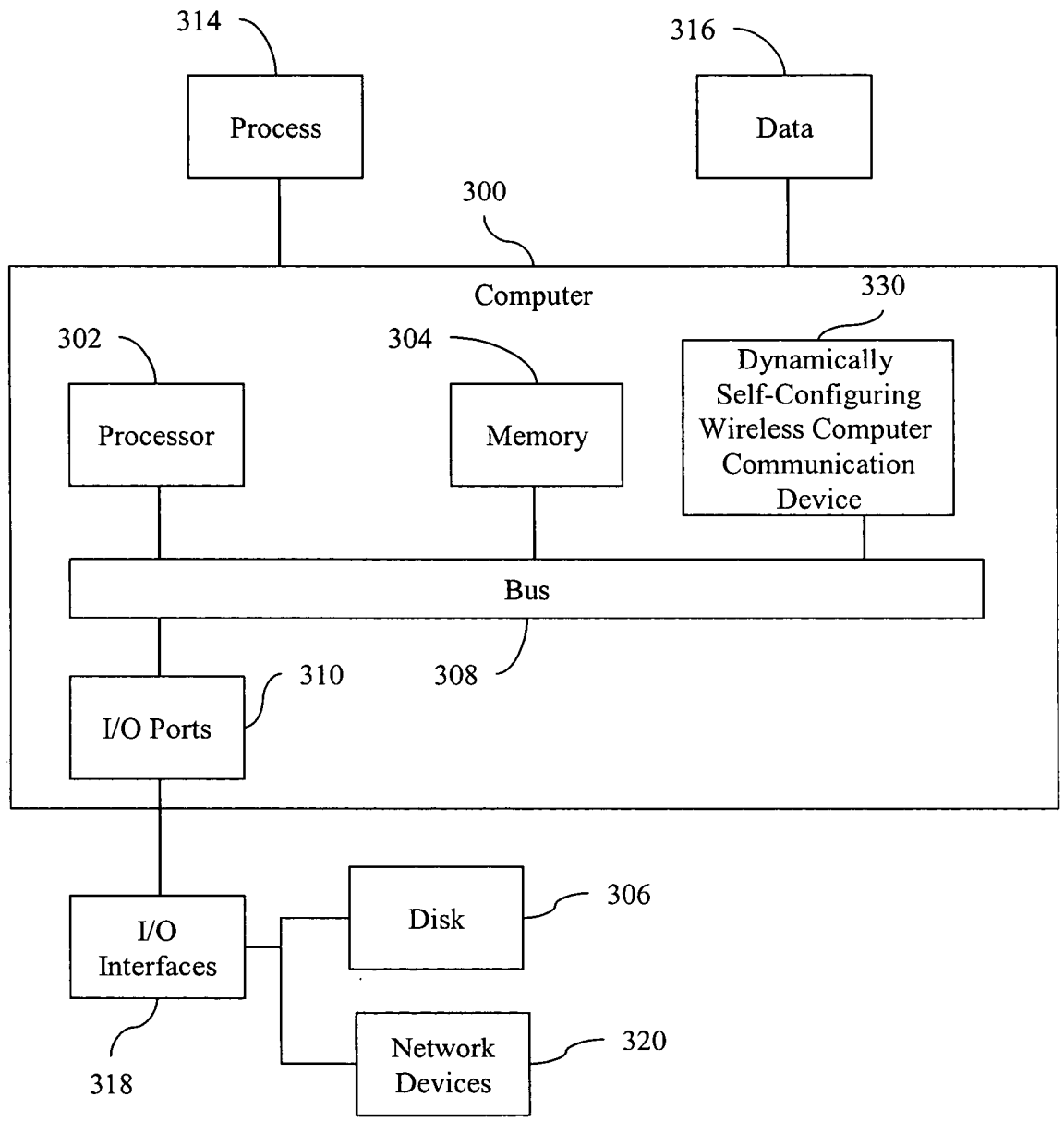
FIG. 3 illustrates an example computer configured with a dynamically self-configuring wireless computer communication device.

FIG. 3 illustrates a computer 300 that includes a processor 302, a memory 304, and input/output ports 310 operably connected by a bus 308. In one example, the computer 300 may include a dynamically self-configuring wireless communication device 330 configured to facilitate automatically adapting to a dynamic wireless communication environment. The self-configuring wireless communication device 330 may include an attenuation level logic and an attenuation circuit like these described herein. Thus, the computer 300 may be able to participate in a wireless computer communication while transmitting less radio frequency energy than a conventional system. The dynamically self-configuring wireless communication device 330, whether implemented in computer 300 as hardware, firmware, software, and/or a combination thereof may provide means for determining a desired attenuation amount by which a wireless computer communication signal is to be attenuated and means for attenuating the wireless computer communication signal by the desired attenuation level. The determining means may include, for example, position determining means, signal strength determining means, quality of service determining means, negotiation means, and the like. The establishing means may include, for example, reduction bridge means, attenuating means, line-loss means, and the like.

The processor 302 can be a variety of various processors including dual microprocessor and other multi-processor architectures. The memory 304 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 306 may be operably connected to the computer 300 via, for example, an input/output interface (e.g., card, device) 318 and an input/output port 310. The disk 306 can include, but is not limited to, devices like a magnetic disk drive, a solid state disk drive, a floppy disk drive, a tape drive, a Zip drive, a flash memory card, and/or a memory stick. Furthermore, the disk 306 can include optical drives like a CD-ROM, a CD recordable drive (CD-R drive), a CD rewriteable drive (CD-RW drive), and/or a digital video ROM drive (DVD ROM). The memory 304 can store processes 314 and/or data 316, for example. The disk 306 and/or memory 304 can store an operating system that controls and allocates resources of the computer 300.

The bus 308 can be a single internal bus interconnect architecture and/or other bus or mesh architectures. While a single bus is illustrated, it is to be appreciated that computer 300 may communicate with various devices, logics, and peripherals using other busses that are not illustrated (e.g., PCIE, SATA, Infiniband, 1394, USB, Ethernet). The bus 308 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 300 may interact with input/output devices via i/o interfaces 318 and input/output ports 310. Input/output devices can include, but are not limited to, a keyboard, a microphone, a pointing and selection device, cameras, video cards, displays, disk 306, network devices 320, and the like. The input/output ports 310 can include but are not limited to, serial ports, parallel ports, and USB ports.

The computer 300 can operate in a network environment and thus may be connected to network devices 320 via the i/o devices 318, and/or the i/o ports 310. Through the network devices 320, the computer 300 may interact with a network. Through the network, the computer 300 may be logically connected to remote computers. The networks with which the computer 300 may interact include, but are not limited to, a local area network (LAN), a wide area network (WAN), and other networks. The network devices 320 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 320 can connect to WAN technologies including, but not limited to, point to point links, circuit switching networks like integrated services digital networks (ISDN), packet switching networks, and digital subscriber lines (DSL).

Figure 4:
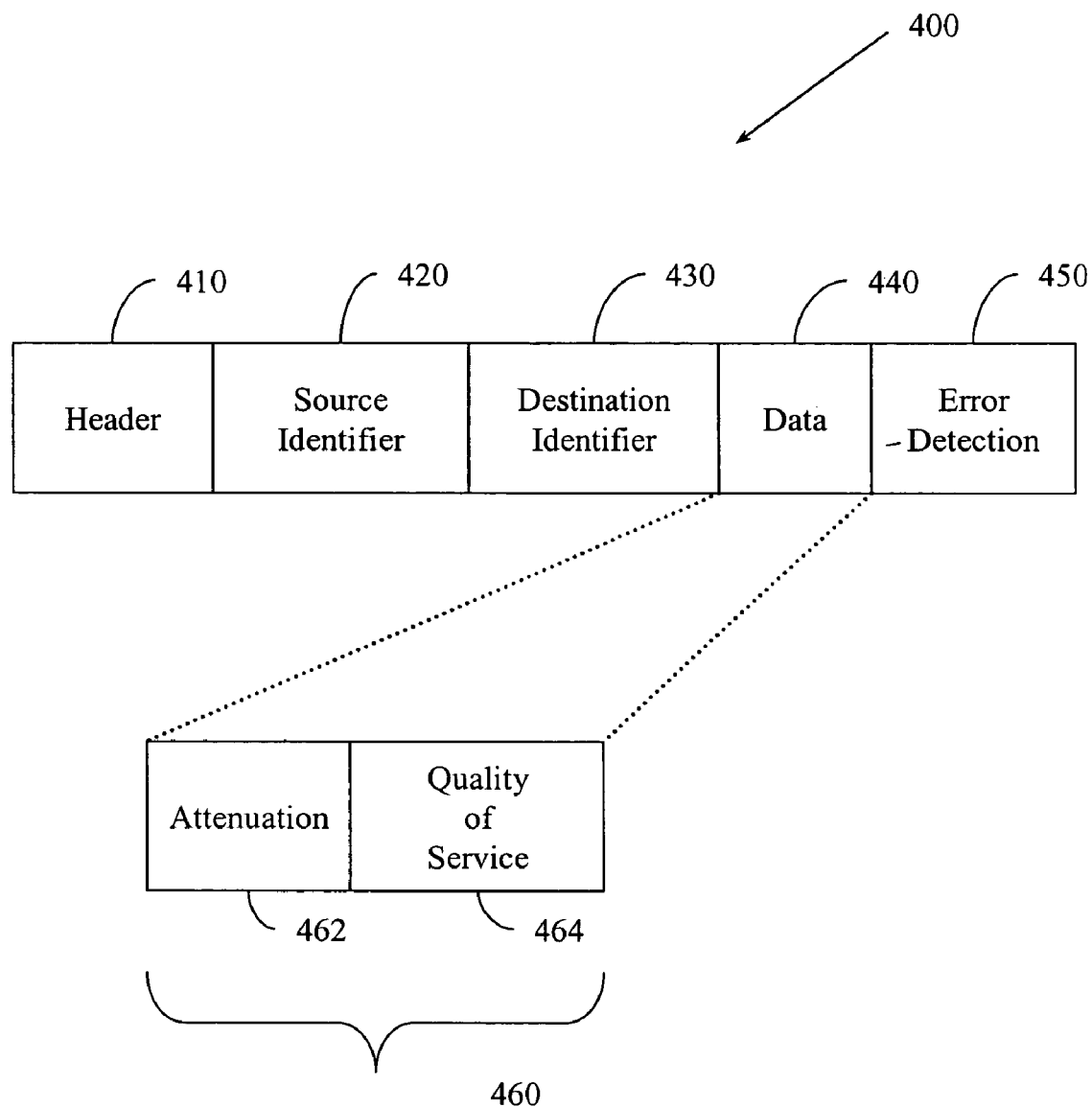
FIG. 4 illustrates an example data packet associated with a computer communication between a device configured to dynamically self-configure a wireless computer communication device and a wireless computer communication device.

FIG. 4 illustrates an example data packet 400 associated with computer communications between a system for dynamically re-configuring a wireless computer communication device by processing an output signal and a wireless computer communication device. Information can be transmitted between various computer components and/or logics associated with dynamically reconfiguring a wireless computer communication device as described herein via data packet 400. The data packet 400 includes a header field 410 that includes information like the length and type of packet. A source identifier 420 follows the header field 410 and includes, for example, an address of the computer component and/or logic from which the packet 400 originated. Following the source identifier 420, the packet 400 includes a destination identifier 430 that holds, for example, an address of the computer component and/or logic to which the packet 400 is ultimately destined. Source and destination identifiers can be, for example, a globally unique identifier (GUID), a uniform resource locator (URLs), a path name, and the like. The data field 440 in the packet 400 includes various information intended for the receiving computer component and/or logic. The data packet 400 ends with an error detecting and/or correcting field 450 whereby a computer component and/or logic can determine if it has properly received the packet 400. While five fields are illustrated in a certain order, it is to be appreciated that a greater and/or lesser number of fields arranged in different orders can be present in example data packets.

FIG. 4 also illustrates sub-fields 460 within the data field 440. The subfields 460 described are merely exemplary and it is to be appreciated that a greater and/or lesser number of sub-fields could be employed with various types of data germane to dynamically reconfiguring a wireless computer communication device by processing a signal provided by the device. The sub-fields 460 include a first field 462 that holds, for example, information concerning an attenuation level. For example, the information may describe an attenuation level to which an attenuation circuit has been set. The sub-fields 460 may also include a second field 464 that holds, for example, information concerning a quality of service attained at the established attenuation level. Thus, the sub-fields 460 may facilitate dynamically self-configuring a wireless computer communication device to evaluate the effect on quality of service of establishing an attenuation level.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:

associating an attenuation circuit with a wireless computer communication device;

determining a desired attenuation level for a wireless computer communication signal produced by the wireless computer communication device;

configuring the attenuation circuit to attenuate the wireless computer communication signal to the desired attenuation level;

recalculating the distance between the wireless computer communication device and the receiver of the wireless computer communication signal; and redetermining the desired attenuation level based, at least in part, on the recalculated distance;

where determining the desired attenuation level includes:

calculating a distance between the wireless computer communication device and a receiver of the wireless computer communication signal; and determining the desired attenuation level based, at least in part, on the distance.

2. The method of claim 1, where determining the desired attenuation level includes:

calculating a signal strength for a wireless signal received from a wireless device; and determining the desired attenuation level based, at least in part, on the signal strength.

3. A method, comprising:

associating an attenuation circuit with a wireless computer communication device;

determining a desired attenuation level for a wireless computer communication signal produced by the wireless computer communication device; and configuring the attenuation circuit to attenuate the wireless computer communication signal to the desired attenuation level;

recalculating a signal strength for a wireless signal; and redetermining the desired attenuation level based, at least in part, on the recalculated signal strength;

where determining the desired attenuation level includes:

calculating a signal strength for a wireless signal received from a wireless device; and determining the desired attenuation level based, at least in part, on the signal strength.

4. The method of claim 3, where determining the desired attenuation level includes:

transmitting a set of wireless computer communications to a wireless device with which the wireless computer communication device is communicating, where the set of wireless computer communications are attenuated at different levels; and determining the desired attenuation level based, at least in part, on a response to transmitting the set of wireless computer communications.

5. The method of claim 4, including:

retransmitting the set of wireless computer communications; and selectively redetermining the desired attenuation level.

6. The method of claim 3, where configuring the attenuation circuit includes:

programmatically changing a resistance in a reduction bridge associated with the attenuation circuit.

7. The method of claim 3, where configuring the attenuation circuit includes:

selecting a desired line loss associated with a transmission medium through which the wireless computer communication signal passes before being transmitted.

8. The method of claim 3, where configuring a wireless computer communication device includes:

selecting an attenuator through which the wireless computer communication signal passes before being transmitted.

9. The method of claim 3, where determining the desired attenuation level includes receiving an input from a human user.

10. A data packet for transmitting attenuation data associated with reconfiguring a wireless computer communication device by attenuating a wireless computer communication signal produced by the wireless computer communication device to a dynamically selectable attenuation level, comprising:

a first field that stores an attenuation level data; and a second field that stores a quality of service data, where the quality of service data is related to receiving a wireless computer communication signal attenuated to a level described by the attenuation level data.

* * * * *